(12) United States Patent
Marshall

(10) Patent No.: US 6,461,634 B1
(45) Date of Patent: Oct. 8, 2002

(54) FOOD-BASED DELIVERY OF HGH-STIMULATING AND OTHER NUTRITIONAL SUPPLEMENTS

(76) Inventor: Edward Marshall, 10932 Savona Rd., Los Angeles, CA (US) 90077

(*) Notice: Subject to any disclaimer, the term of this patent is extended or adjusted under 35 U.S.C. 154(b) by 0 days.

(21) Appl. No.: 09/641,614

(22) Filed: Aug. 17, 2000

Related U.S. Application Data

(60) Provisional application No. 60/149,962, filed on Aug. 20, 1999.

(51) Int. Cl.$^7$ .............................................. A61K 47/00
(52) U.S. Cl. ....................... 424/439; 424/400; 424/441; 424/484; 424/489; 514/904; 514/905; 514/948
(58) Field of Search ................................ 424/400, 439, 424/441, 484, 489; 514/904, 905, 948

(56) References Cited

U.S. PATENT DOCUMENTS

| | | | |
|---|---|---|---|
| 5,360,614 A | * 11/1994 | Fox et al. ................... | 424/439 |
| 5,629,020 A | * 5/1997 | Leone-Bay et al. ......... | 424/489 |
| 5,792,451 A | * 8/1998 | Sarubbi et al. ............ | 424/85.4 |
| 5,808,151 A | * 9/1998 | Epperson et al. ............ | 564/48 |
| 5,891,469 A | * 4/1999 | Amselem ................... | 424/451 |

OTHER PUBLICATIONS

Grow Young with HGH, Dr. Ronald Klatz with Carol Kahn, First HarperPerennial edition published 1998.

Exercise–induced GH Secretion is enhanced by the oral ingestion of melatonin in healthy adult male subjects, European Journal of Endocrinology (1999) 141.

Effects of Human Growth Hormone in Men Over 60 Years Old, The New England Journal of Medicine, vol. 323, Jul. 5, 1990, No. 1, Daniel Rudman, M.D.

* cited by examiner

Primary Examiner—Thurman K. Page
Assistant Examiner—Charesse Evans
(74) Attorney, Agent, or Firm—Mark R. Wisner

(57) ABSTRACT

A food, or ready-to-drink beverage, delivery system for increasing the production and release of human growth hormone (HGH) for anti-aging effects and/or to improve a condition of HGH deficiency. A food bar, powder, other food forms, or ready-to-drink beverage that contains the full range and optimal dosages of vitamins, minerals, non-prescription hormonal and herbal supplements most desired by individuals who regularly take such supplements from numerous bottles or other packages. HGH stimulation and the above-described supplementation may be delivered for oral ingestion separately or together in the same aliquot, said aliquot providing a pleasant-tasting and convenient snack or mini-meal in addition to the specific HGH stimulation and supplementation. L-glutamine, glycine and melatonin are sufficient to boost HGH up to age 60, and it is preferred to add L-arginine and L-lysine for individuals of age 60 and older. The single food or beverage aliquot makes unnecessary the inconvenient ingestion of numerous pills from numerous bottles, or ill-tasting powders that must be mixed with water. Calories are kept under about 300, and carbohydrate is kept generally below about 5 grams per aliquot in order to permit the stimulation of HGH when the stimulating ingredients are consumed in the form of food or nutritional ready-to-drink beverage. Ingredients are included as needed for optimal flavor and texture choices, and to prevent spoilage.

15 Claims, No Drawings

FOOD-BASED DELIVERY OF HGH-STIMULATING AND OTHER NUTRITIONAL SUPPLEMENTS

This application claims benefit of provisional application No. 60/149,962, filed Aug. 20, 1999.

BACKGROUND OF THE INVENTION

The present invention relates to a food-based delivery system for providing (a) the required nutritional supplements for stimulating production and release of human growth hormone (HGH) and/or (b) a full range and desired dosages of vitamins and minerals consumed each day by serious takers of such supplements. In more detail, the present invention relates to combinations of amino acids, vitamins, and other nutrients formulated into a convenient and good-tasting food such as a food bar or ready-to-drink beverage that, when ingested orally, stimulates HGH production and/or release for the purpose of producing anti-aging effects. The same food is formulated to provide the full range of the most commonly desired vitamins and minerals consumed by adults who are serious consumers of vitamin and mineral supplements or the vitamins and minerals can be formulated separately for ingestion without the HGH-stimulating amino acids and other nutrients. Either way, the food-based delivery system of the present invention provides a full complement of the vitamins, minerals, and other nutritional supplements in adequate quantity to satisfy most serious consumers of such supplements in a pleasant-tasting form.

With regard to the prior art, it is known to those skilled in the art and to many of the public in general, that HGH levels fall with age starting at about age 35, so that HGH levels are reduced by about two-thirds by the age of 60. It is know that when the HGH levels are restored to more youthful levels, by a schedule of either injections of HGH, or the oral consumption of certain combinations of amino acids, over the ensuing 20 to 180 days, anti-aging effects occur, including: boosting of the immune system, restoration of more youthful vigor and libido, increase of the percentage of lean muscle mass, reduction of the percentage of body fat, increase in the thickness of skin with more youthful texture, increased skin turgor and a decrease of brown "aging" spots.

The beneficial anti-aging effects of increased levels of growth hormone in humans are well documented. See, for instance, R. Klatz, et al., Grow Young with HGH, New York, HarperCollins Publishers, 1997; see also D. Rudman, et al., Effects of Human Growth Hormone in Men Over 60 Years Old; New England Journal of Medicine, 1990; vol 323; 1:1. In the book by Klatz there are numerous references to published and unpublished studies showing the efficacy of orally ingested amino acids in elevating HGH levels and HGH has long been given by injection. The disadvantages of these prior art methods, however, are several: HGH injections are painful and inconvenient, and the cost usually exceeds $10,000 per year. There can be side effects if the injected dosage is too high for the individual. Injections require careful monitoring of blood laboratory tests and careful physician follow-up. If the person is to take the available pill form of HGH-stimulating amino acids, he/she must take eight to sixteen different pills from four to five different bottles one to four times a day. Some of the pills are quite large, and if one is to take all four of the recommended amino acids in correct dosage, one would have to take is pills from as many as four different bottles at each dosage time, for a total of about 16 pills per dose. Further inconvenience is caused by the fact that the pills of the different bottles run out at different intervals, requiring numerous trips to health food stores. In many locales, some of the ingredients are not available for sale in any store. Typical schedules require taking the pills 6 out of 7 days, with breaks of 2 to 6 weeks every 3 to 6 months, and missing any of the recommended dosages or pills can lessen the desired effects.

Because of the inconvenience of numerous bottles of pills of amino acids, there has been the commercial development and sales of powders of the required amino acids, to be mixed with water, or juice, or milk or even swallowed dry. This method is also inconvenient, and some of the powders available are quite unpalatable. It is not convenient to have to mix powders with water while away from home. Also, according to the prior art, it is recommended that either the pills or the powders be consumed on an empty stomach, with no eating to occur for the next 45 minutes. The reason for this recommendation is that it is known in the prior art that significant elevation of blood glucose, which in turn raises blood insulin levels, will suppress production and release of HGH, because higher blood insulin levels lead to higher levels of somatostatin. Somatostatin is a natural hormone produced by the hypothalamus that suppresses HGH release.

Known in the prior art is the fact that the best four amino acids to ingest for the stimulation of HGH release are L-ornithine, L-arginine, L-glutamine and glycine. However, L-lysine may be substituted for L-ornithine, and usually has been, because L-ornithine has a very bad taste. It has been found that 1200 to 1500 mg of L-lysine, together with 1200 to 1500 mg of L-arginine, will suppress somatostatin, which is especially important in those over age 60, because somatostatin is increased in the older age group. Suppressing somatostatin allows more release of HGH. L-glutamine, about 3,000 to 4,000 grams, and glycine, about 1,000 to 2,000 mg, are recommended as stimulants of the natural hypothalamic hormone called GHRH (growth hormone releasing hormone) which in turn stimulates increased HGH production and release. It is also known that 5 mg of melatonin taken one hour prior to vigorous exercise can triple the increase in HGH resulting from vigorous exercise alone. D. Meeking, et al., Exercise-induced GH Secretion is Enhanced by the Oral Ingestion of Melatonin in Healthy Adult Male Subjects; European Journal of Endocrinology; 1999; vol. 141:22–26.

The powders that contain the appropriate amino acids are available in cans and jars that come with scoopers for measuring dosages into a glass to which water or other beverage is to be added. The problems with this prior art are: consuming the powder dry is very difficult, and many of the powders taste bad, even if mixed with water; if mixed with juice or milk, the fructose or lactose of the juice/milk raises blood glucose and insulin levels, which is counter-productive for HGH release as described above. The whole process of opening individual packets, obtaining an empty glass or cup, and obtaining water can be difficult if dose-time occurs when one is away from home, and even more-so during out-of-town trips. The recommendation, for the powdered products known as Rejuvamin and Revamax (Biocentrics), for example, is for one to four doses per day, with two or more doses being preferred. At each dose time, one to one and one-half scoops, or one unitized packet, must be mixed with water or consumed dry.

One object of the present invention, then, is to provide a new method of stimulating production of HGH for delaying, retarding, and/or partially reversing the effects of aging, in the form of a tasty, convenient food bar, other edible food or ready-to-drink beverage. To stimulate HGH production in this manner goes against the teaching of the prior art because it was believed not to be possible to combine the necessary amino acids with any food for the reasons stated above. In the present invention, use is made of the fact that high protein, low carbohydrate diets and food bars have become quite acceptable, even replacing a certain amount of candy bar sales wherein the candy contains sugar. It is known that protein food bars, protein foods in general, and beverages such as protein shakes, diet sodas, etc., do not significantly raise blood glucose levels or insulin levels if the carbohydrate level in such foods is below 3 grams per serving. The delivery system of the present invention therefore combines the preferred amino acid dosages with food or ready-to-drink beverages that taste good and are convenient, as opposed to the prior art of powders and numerous pills.

In recent years, an increasing number of individuals have begun taking a wide variety of increasing variety and dosages of vitamins, minerals, and other nutritional supplements. Such individuals ingest not only a multivitamin with minerals, each day, but a whole list of additional nutritional vitamin and mineral supplements. To do so, such individuals have had to open and close between 8 to 15 or more bottles of pills at least once each day in order to ingest the many nutritional supplements considered essential. The reason for this is that no one or two pills can be swallowed that would contain all of the ingredients combined. They would be far too large. In addition to a multivitamin with minerals, many people ingest a list that contains some or all of the following each day: vitamin C 500 mg; vitamin E 400 IU; calcium citrate 400 mg; magnesium oxide 200 mg; co-enzyme Q10 50 mg; chromium piccolinate 200 micrograms; and selenium 200 micrograms. Taking just this list of supplements alone generally requires ingestion of about ten pills. Many people take even higher doses of some of the above, plus many other supplements including hormones, amino acids, and herbal preparations such as ginko biloba, saw palmetto and the like. It is therefore not unusual for serious adult takers of supplements to require from 8 to 15 different bottles of pills. The inconvenience is apparent. Travel out of town is an obvious problem where so many bottles of pills are involved. Also, the pills in the various bottles run out on different days, requiring frequent trips to the stores. One can count out pills for the week into piles, then place each day's pile of pills into a zip-able plastic bag, but such a process is far from convenient.

So far as is known, pills and/or powders are the only way for such individuals to ingest the vitamins, minerals, and other nutritional supplements in the quantities that is desirable. In the prior art, to combine all these vitamin and mineral supplements in sufficient quantity to make the pills or powders unnecessary in a food or beverage form results in a product that is quite unpalatable.

For all of the above reasons, another of the objects of the present invention is to combine all of the desirable doses of vitamins, minerals, and other nutritional supplements into a convenient, tasty food bar, or any other food or ready-to-drink beverage. The food bar has the advantage also of serving as a tasty snack food, in addition to its other uses. The vitamins and minerals, and other hormonal or herbal supplements, can be combined with the anti-aging ingredients into the same food bar or other food or ready-to-drink beverage portion. The same vitamins, minerals, and nutritional supplements can be added to the food bar or other food or ready-to-drink beverage portion without the anti-aging amino acids and melatonin. Or, the anti-aging ingredients can be combined into the food bar or other food or beverage portion without any vitamins, minerals or other supplements. The reasons for each of these three versions of the present invention will be made clear by the following description of the presently preferred embodiments thereof.

SUMMARY OF THE INVENTION

The above described objects are achieved by providing an orally ingestible food or ready-to-drink beverage having a caloric content of less than about 300 calories comprising:

(A) the two amino acids, glycine, 1 to 2 grams, and L-glutamine, 2 to 4 grams, plus about 5 mg of melatonin (range of 5 mg to 6 mg) for the purpose of raising HGH levels in order to obtain anti-aging effects in adults over the age of 35 years but generally less than 60 years of age.

(B) The same as (A) but together with the full daily range and dosages of vitamins, minerals and other supplements typically preferred by those who are serious about their daily oral ingestion of such supplements; this version, (B), of the invention is intended to be taken just once a day, whereas (A) may be taken from one to four times a day; the limitation to once a day for (B) is to avoid excessive dosages of vitamins, minerals and other supplements.

(C) The same vitamins, minerals and other supplements as (B), but without the anti-aging ingredients as in (A), for those people under the age of 35 or for people of all ages who do not wish to ingest nutrients that elevate HGH levels.

(D) The same as (A), but with the addition of two additional amino acids, in approximately equal volumes, L-arginine, 1.2 to 1.5 grams, and L-lysine, 1.2 to 1.5 grams; this version of the invention, (D), is intended for individuals of 60 years of age or older, in order to maximize the effectiveness of increasing HGH levels in the bodies of such older persons.

(E) The same as (D), but also comprising the vitamin, mineral and other supplements as in (B).

The food portion, or ready-to-drink beverage portion, common to (A) through (E), comprises mainly protein foodstuffs, with some fat, preferably 4 to 8 grams, but less than 3 grams of carbohydrate per aliquot, and may include flavorings, water, and/or essentially non-caloric sweeteners as needed for appropriate flavors, all formulated to provide a desired volume and taste.

The objects of the invention are also achieved by providing a method for stimulating production of HGH comprising the steps of orally ingesting a palatable, even tasty, convenient food or ready-to-drink beverage comprising a combination of from two to four amino acids as above, and melatonin, and a method of orally ingesting a palatable, even tasty, convenient food or ready-to-drink beverage comprising the full range and daily dosages of vitamins, minerals and other supplements, with or without the above amino acids and melatonin.

In another aspect, the objects of the present invention are achieved by providing an orally-ingestible food having a caloric content of less than about 600 calories comprising proportions of the amino acids L-glutamine and L-glycine in approximately a 2:1 ratio (by weight), and optionally, melatonin in a proportion of approximately 0.001% to about 200% of the proportion of each amino acid; and a combination of protein, carbohydrate, and fat foodstuffs and flavorings formulated to provide a desired volume and taste.

These objects are also achieved by providing a method for stimulating production of human growth hormone comprising the steps of orally ingesting a food comprising a combination of two or more human growth hormone production-stimulating amino acids and melatonin and a combination of vitamins and minerals providing a full complement of the vitamins and minerals ingested each day and ingesting a food comprising a combination of two or more human growth hormone production-stimulating amino acids and melatonin up to four times each day.

DETAILED DESCRIPTION OF THE PREFERRED EMBODIMENTS

The food of the present invention is preferably provided in aliquots, each aliquot of the food including a pre-selected volume of the ingredients set out below. The term "aliquot" as used herein is intended as an all-inclusive term that contemplates that the food of the present invention is packaged and/or supplied in any one or more of a number of forms having a volume that provides a prescribed amount of the ingredients set out below for consumption by an individual for the purpose of increasing production and/or release of human growth hormone (HGH) conveniently and without suffering ill-tasting ingredients, and/or for the purpose of providing the full range and dosages of commonly ingested vitamins, minerals, and other nutritional supplements in an equally convenient and pleasant tasting form.

For instance, in one preferred embodiment, an aliquot of the food of the present invention takes the form of a food bar, or nutrition bar, preferably supplied in foil or other types of wrappers, as is commonly seen in most food markets, convenience stores and health food stores. Most such food or nutrition bars are commonly made by a machine extrusion process that extrudes the mixed ingredients into the desired size and shape bar, which is then conveyed to automatic wrapping machinery. In another preferred embodiment, the food bars are baked, rather than extruded. In either case, the food bars are provided in a pleasant tasting and convenient form. The aliquot of food, with or without the vitamins, minerals, and/or other nutritional supplements, may also be extruded, baked, rolled, pressed, cut or otherwise formed into bars, cookies, brownies, cakes or muffins. In the manufacturing process for bars that are extruded, ingredients such as glycerine, lecithin, vegetable and other oils (such as sunflower oil) are used in part to help bind ingredients together so as to help form a uniformly shaped bar in the extrusion machinery. Such known processes are used to produce the present invention which also contains the ingredients as further described below.

In another embodiment, the human growth hormone production-stimulating and/or vitamin, mineral and/or other nutritional supplement providing food of the present invention comprises a ready-to-drink beverage, requiring no addition of water and/or mixing with water or other liquids, or a powder or a liquid concentrate that is mixed with water, fruit juice, fruit and/or other flavored drinks, and/or fruit drink concentrates to make, for instance, a flavored beverage, or with milk to make a drink having a character similar to that of a milk-shake. When provided in this form, a measured amount of a powder manufactured in accordance with the present invention is mixed with water, fruit juice, flavored beverage, and/or milk to provide an aliquot of the food of the present invention. Because many individuals consume a large number of supplements each day from numerous bottles, the present invention provides a convenient and pleasant-tasting delivery system that is compatible with use at home or away from home. This convenience, and the pleasant-tasting features of the present invention, apply to delivery of the supplements for anti-aging as well as the vitamin, mineral and other supplements, and the convenience and the pleasant-tasting features of the present invention apply to the delivery of these multiple health-benefiting ingredients by a food bar or other such product, as a powder to be mixed with a liquid, and in the ready-to-drink beverage mode.

Alternatively, the food of the present invention is mixed with other liquids either at the time of consumption or manufacture, in which case it is packaged and sold in an appropriate convenience-type container, or packaged as a liquid in a volume that provides an aliquot of the prescribed volume. In another preferred embodiment, a powder is manufactured in accordance with the present invention that is suitable for addition to such foods as sauces and soups for consumption as part of a normal meal in a volume that provides an aliquot of the prescribed volume.

Regardless of how it is manufactured, a preferred embodiment of the food of the present invention comprises an aliquot of an orally-ingestible food having a caloric content of less than about 600 calories, and preferably less than about 300 calories, that includes:

For HGH-stimulation and anti-aging results for individuals between the ages of 35 to 60: L-glutamine, 2 to 4 grams, and glycine, 1 to 2 grams, plus melatonin 5 to 6 milligrams. Melatonin has been discovered to be a useful adjunct for HGH-stimulation, but is not required to stimulate HGH production and release. Although it is preferred that the amino acids L-glutamine and glycine be combined in the volumes set out herein, those skilled in the art who have the benefit of this disclosure will recognize that the desired results can be obtained by combining these two amino acids in a weight ratio of from about 1:4 to about 4:1 L-glutamine to glycine. The preferred dosage is one aliquot including these amounts and proportions of amino acids and melatonin from one to four times daily, on an empty stomach. Water or other non-caloric, sugar-free liquid may be consumed with each aliquot. Preferred times of day are upon arising, mid-to-late morning, mid-to-late afternoon, and bedtime. No other calorie intake should take place for at least 45 minutes after ingestion of each aliquot.

For HGH-stimulation and anti-aging results for individuals aged 60 and older: The above three ingredients plus approximately equal volumes (by weight) of the amino acids L-lysine and L-arginine in the amounts of 1.2 to 1.5 grams of each. As is the case with the amino acids L-glutamine and glycine, the preferred proportions of L-lysine and L-arginine are as set out herein, but those skilled in the art who have the benefit of this disclosure will recognize that the desired results can be obtained by combining these two amino acids in a weight ratio of from about 1 to about 4 parts L-lysine and L-arginine to one part glycine. The preferred dosage of this combination of amino acids and melatonin is one aliquot containing these proportions of amino acids and melatonin ingested one to four times daily, preferably on an empty stomach. Water or other non-caloric, sugar-free liquid may be consumed with each aliquot. Preferred times of day are upon arising, mid-to-late morning, mid-to-late afternoon, and bedtime. No other calorie intake should take place for at least 45 minutes after ingestion of each aliquot. The aliquot as described above that does not contain L-lysine and L-arginine may also be effective for persons aged 60 and older.

For delivery of the full range and dosages desired by the majority of serious takers of vitamins, minerals and other supplements, the list of vitamins and minerals included are: Vitamin C 500 mg; Vitamin E 400 IU, selenium 200 micrograms, chromium piccolinate 200 micrograms, Co-enzyme Q10 50 milligrams, magnesium oxide 200 mg and calcium citrate 400 mg, Vitamin A 5000 IU, Vitamin D 400 IU, thiamine 1.5 mg, riboflavin 1.7 mg; niacinamide 30 mg, Vitamin B6 2 mg, folic acid 400 mcg, Vitamin B12 6 mcg, biotin 30 mcg, pantothenic acid 10 mg, iron 18 mg, phosphorus 109 mg, iodine 150 mcg, zinc 5 mg, copper 2 mg, potassium 80 mg, Vitamin K 25 mcg, manganese 3.5 mg, molybdenum 150 mcg, chloride 72 mg, nickel 5 mcg, tin 10 mcg, silicon 2 mg, vanadium 10 mcg, boron 150 mcg.

For those under age 35, or for those individuals of any age who do not wish to increase their blood levels of HGH, the food of the present invention will include only the vitamin and mineral supplements, and not the anti-aging HGH-stimulating supplements. For those who wish to accomplish both the HGH and the vitamin and mineral ingestion in a single aliquot, the ingredients may be combined into the same aliquot.

A combination of high percentage protein, very low carbohydrate, and low to, moderate fat foodstuffs and flavorings formulated to provide a desired volume and taste.

In a particularly preferred embodiment, the food manufactured in accordance with the teachings of the present invention also includes sufficient potassium sorbate or other preservative(s) and/or antioxidants to prevent oxidation/spoilage and total mass is approximately 100 grams or less, and preferably approximately 60 grams, to adequately restrict caloric intake and thereby prevent a rise in blood glucose and insulin levels.

It is anticipated that the above-described serious takers of large numbers and quantities of vitamin, mineral, hormonal and herbal supplements will still want to take supplements from several bottles of such items that are not included in a standard aliquot of the present invention. Likewise, some such takers of daily supplements will prefer larger doses of certain vitamins and minerals than will generally be contained in an aliquot according to the teachings of the present invention. Individual requirements and preferences will therefore result in such persons ingesting some additional supplements contained in various bottles. However, the present invention significantly reduces the number of such separate bottles and packets of pill-form and liquid supplements for essentially all individuals, providing a significant convenience factor. So far as is known, it has heretofore not been possible to provide all these supplements in a single, pleasant tasting food product. In the present invention, flavorings and masking agents such as ginger oil and malic acid are able to provide palatability.

The food bars, other food forms or ready-to-drink beverages of the present invention also provide individuals with a source of nourishment and calories, either as a pleasant-tasting snack available in a variety of flavors, or as a mini-meal. It is estimated that a single aliquot will provide sufficient nourishment to be equivalent to about one-fourth to one-half of a meal for most individuals. No such nourishment is provided by the ingesting of individual anti-aging amino acids, melatonin, vitamins, minerals or other supplements when not ingested as part of an aliquot of a food bar, other food form or ready-to-drink beverage.

It is anticipated that other orally ingestible vitamin, mineral, hormonal or herbal supplements will be included or excluded, or dosages changed, based on the desires of the individual consumers and based on new knowledge that may be obtained in the future. The present invention anticipates and encompasses such changes in dosages and types of supplementation when said supplementation ingredients are prepared or manufactured for oral ingestion in the convenient and pleasant-tasting forms of food bars, other food or ready-to-drink beverage aliquots.

It is also anticipated that other orally ingestible stimulants of HGH production and release will be found to be equal to or superior to the particular preferred ingredients as described herein, as further medical research unfolds. The present invention anticipates and encompasses such ingredients, either as additional ingredients or as substituted ingredients, including changes in exact dosages, when such ingredients are intended to increase HGH blood levels, and are prepared or manufactured for oral ingestion in the convenient or pleasant-tasting form of food bars or other food or ready-to-drink beverage aliquots.

The food of the present invention may optionally include other HGH-stimulating ingredients, including gamma hydroxybutyrate in a weight of approximately 500 mg and or omithine in a weight of approximately 500 mg up to about 1.5 grams. When made up in a particularly preferred embodiment, a food bar of approximately 35 to 70 grams is manufactured in accordance with the teachings of the present invention with a caloric content of less than about 300 total calories, that includes, in addition to the prior stated amounts of the amino acids L-glutamine, L-lysine, and L-arginine, and glycine, and melatonin, with or without the above-listed vitamins, minerals, and other nutritional supplements, in combinations as described;

15–35 grams of a blend of proteins that may include any or all of: isolated soy protein, whey protein isolate, hydrozyzed collagen, and/or casein, such as calcium caseinate;

4–8 grams of fat that may included almond butter, canola oil, sunflower oil, and/or other vegetable oils;

flavoring(s) to taste, which may include nut meats, nut butters, cheese or cheese flavorings, spices, fruit flavors, chocolate, vanilla, and non-sugar sweeteners such as sorbitol, maltitol, xylitol, sucralose, polydextrose, glycerine (also known as glycerol), stevia, saccharin, and aspartame; dextrose, glucose, sucrose and fructose may be used in the vitamin/mineral aliquot form when prepared without HGH-stimulating ingredients; in such form, the carbohydrates may be increased, and protein may be decreased; and water as, and if, needed for consistency.

Those skilled in the art will recognize that the proportions of these ingredients can be varied by ±25% without departing from the teachings of the present invention. It will also be recognized that individual ingredients may be varied according to taste and in accordance with specific manufacturing equipment and with the intended purpose of the food bar, other food, or ready-to-drink beverage. For instance, some individuals prefer a fruit flavor, others prefer chocolate or vanilla, while still others may prefer an un-sweetened food bar or other food form, such as cheese, nacho cheese, or cheese pizza flavor. It is also anticipated to manufacture a food form with bacon or other meat flavorings or meat ingredients. Spices could include salt, pepper, chili, onion, garlic, cinnamon, rosemary, thyme, basil and the entire array of spice flavors.

It is recommended that when the present invention is ingested in a form that includes HGH-stimulating ingredients, the food bar or other food or ready-to-drink beverage should be ingested when the stomach is empty, since it is known that the amino acids and melatonin are best absorbed and most efficacious in stimulating HGH blood levels when ingested on an empty stomach, and when blood glucose and insulin levels have not been increased because of carbohydrate intake. It is known that small amounts of protein and fat will not significantly elevate blood glucose or insulin levels, which information is critical to the efficacy of the present invention, since it allows the forms of food or beverage as described herein to be consumed with the HGH-stimulating ingredients combined with said low-carbohydrate food or beverage. In a particularly preferred dosage regimen, the HGH-stimulating and/or vitamin, mineral, and other nutritional supplement-containing food of the present invention is ingested for six out of every seven days, abstaining one day each week, and/or abstaining for two weeks after every three months, or abstaining for six weeks every six months.

When produced or manufactured in the form of a food bar, the food of the present invention may include flavor enhancers, masking agents (for example, ginger oil or malic acid to mask the taste of L-arginine which tends to be bitter to the taste), fillers, binders, soy flour, wheat germ, coconut oil or other fruit oils, tomato or tomato flavoring, gums such as gum arabic, dextrin, cumin, oregano, tumeric, colorings (both artificial and natural), and many other ingredients known in the art. When the food of the present invention is utilized only to provide vitamin and mineral supplementation, and not to stimulate HGH, other carbohydrate ingredients may be used more freely, such as rice, oats (toasted or rolled), wheat, flours of all types, milk products in all forms, corn, barley, beans and other legumes, and low carbohydrate/caloric sweeteners such as dextrose, glucose, sucrose and fructose.

For individuals who are diabetic, the essentially non-caloric sweeteners will be preferred. When the flavor is cheese flavor, sweeteners of any type would be used in small amounts, if at all. The management and production of various flavors of food bars, other food and ready-to-drink beverages is well known in the food industry.

No matter how the food of the present invention is manufactured and ingested, it is preferred that the total caloric content of an aliquot, when HGH-stimulating ingredients are included, is less than about 300 calories, and preferably between about 175 and about 275 calories. Sufficient volume of food and flavorings is required in the present invention to produce a pleasant-tasting product, especially considering the fact that the flavor of certain amino acids, vitamins and minerals would otherwise not be pleasant. For example, it is unlikely that a food bar of less than 50 grams would be sufficiently pleasant in taste or texture. It is further preferred, that when HGH-stimulating ingredients are included, the total carbohydrate content is about 5% or less. For instance, if manufactured in the form of a food bar, it is preferred that the bar have a total mass of not more than about 60 grams and that it include only about 2 to about 5 grams of carbohydrates, with a preferred range of from about 2 to about 3 grams, so that fewer than about 5% of the total calories of each aliquot is from carbohydrates. Some ingredients such as glycerine/glycerol and maltitol are carbohydrates, but are not metabolized in a manner that significantly raises blood glucose levels. Therefore, many manufacturers of low carbohydrate food bars do not include these ingredients as carbohydrates for purposes of limiting total carbohydrate content of the food bar, and the present invention utilizes this same convention by not including such ingredients in the calculation of carbohydrate content. In addition to the requirement for low carbohydrates to allow for maximal HGH-stimulation, a low carbohydrate content is desirable for diabetics or those on a low carbohydrate diet for weight control purposes, such as those on an Atkins-type of eating plan.

Likewise, it is generally preferred that the fat content be kept under 10 grams per aliquot, and preferably in the range of 4–8 grams, so that fewer than about 30% of the total caloric content of each aliquot is from fat. Lower fat content promotes more rapid absorption of HGH-stimulating ingredients, and is preferred by many individuals who are trying to lose weight or to prevent weight gain. Similar proportions and limitations are utilized when the food of the present invention, when used to stimulate HGH, is provided in the form of a powder for mixing with liquids and sauces, a liquid concentrate, or a ready-to-drink beverage.

In a particularly preferred form, the food of the present invention is provided as a system, or method, for delivery of the growth hormone production stimulating ingredients. In one embodiment, such a system comprises the ingestion of a total of one to three aliquots comprised of the previously-detailed amino acids suitable for a person's age plus melatonin and, in addition, one aliquot that is the same, but also includes the full range and dosages of the preferred vitamins and minerals. The aliquot that contains the vitamins and minerals is ingested only once each day to prevent excessive intake of vitamins and minerals. Such a system may be packaged in a single, compartmentalized container having two compartments with approximately 2:1 up to approximately 5:1 volume ratios, the food (powder or concentrate) from each compartment being ingested two-five times and one time each day, respectively.

In the preferred form, when the present invention includes vitamins and minerals, the most popular and widely used dosages of the full range of vitamins and minerals have been included, as previously detailed, making unnecessary the usual staggered purchases of numerous bottles of such nutrients, and the inconvenient opening and closing of 8 to 15 such bottles each day. It is common for pills to be dropped to the floor, and the large number of pills are often difficult to swallow if the individual attempts to swallow several at once.

The addition of melatonin to the HGH-stimulating ingredients definitely enhances the HGH response to exercise. Vigorous exercise for just eight minutes, performed approximately one hour after ingestion of the food or beverage vehicle of the present invention that contains the HGH-stimulating ingredients, will result in a maximum response in terms of increased HGH blood levels. It is believed that even without exercise, the HGH responses will be greater than without melatonin, especially in the elderly, who generally have markedly reduced melatonin blood levels. However, HGH-stimulation can be achieved utilizing the combination of amino acids described above without the addition of melatonin.

As noted above, those skilled in the art who have the benefit of this disclosure will recognize that certain changes can be made to the component ingredients of the food or beverage of the present invention without changing the manner in which those ingredients function to achieve the intended result of stimulating growth hormone production, release, and increased blood levels. For instance, additional ingredients may be incorporated, or substituted for other ingredients, into the food or beverage to produce the same or enhanced stimulation of HGH. Examples of such ingredients are the amino acids L-tryptophan and L-carnitine. L-tryptophan may be preferred by some individuals to be included in the bedtime aliquot, since L-tryptophan may cause drowsiness and enhance sleep. All such changes, and others which will be made clear to those skilled in the art by this description of the preferred embodiment, are intended to fall within the scope of the following, non-limiting claims.

What is claimed is:

1. A delivery system for orally stimulating production and release of human growth hormone comprising an orally-ingestible food having a caloric content of less than about 600 calories, about 5% or less of the calories being carbohydrate calories, comprising:

the amino acids L-glutamine and glycine in approximately 1:4 to approximately 4:1 proportions by weight;

melatonin in a range of approximately 0.001% of the volume of each amino acid up to about 200% of the volume of each amino acid; and a combination of protein, carbohydrate, and fat foodstuffs and flavorings formulated to provide a desired volume and taste.

2. The human growth hormone production stimulating system of claim 1 wherein said orally-ingestible food additionally comprises one or more of the following: vitamins, minerals, hormonal supplements, or herbal supplements.

3. The human growth hormone production stimulating system of claim 1 wherein the total mass of said orally-ingestible food is less than about 75 grams.

4. The human growth hormone production stimulating system of claim 3 wherein less than about 30% of the caloric content of said. orally-ingestible food is from fat.

5. The human growth hormone production stimulating system of claim 1 additionally comprising the amino acids L-arginine and L-lysine in approximately equal proportions and in a proportion of approximately 1:4 to approximately 4:1 to the proportion of glycine.

6. The human growth hormone production stimulating system of claim 1 additionally comprising a second orally-ingestible food, said second orally-ingestible food comprising a combination of vitamins and minerals providing a full complement of vitamins, minerals, and other nutritional supplements.

7. The human growth hormone production stimulating system of claim 6 wherein said first and second orally-ingestible foods are ingested in a volume ratio of approximately two to four volumes of said second orally-ingestible food to approximately one volume of said first orally-ingestible food.

8. The human growth hormone production stimulating system of claim 7 wherein either of said first and second orally-ingestible foods comprise either a baked, extruded, or otherwise processed food bar.

9. The human growth hormone stimulating system of claim 1 wherein the total mass of an aliquot of said orally-ingestible food is under 100 grams and the total calorie content per aliquot is below 300 calories, preferably in the range of 175 to 275 calories.

10. A method for stimulating HGH so as, to increase the blood levels of HGH comprising the steps of orally ingesting an aliquot of food in any form, or an aliquot of a ready-to-drink beverage, comprising a combination of one or more HGH stimulating amino acids, with or without melatonin, and a combination of some or all of vitamins, minerals, and other nutritional supplements, in the dosages and ranges most commonly preferred by those individuals who are serious about the daily intake of such supplements, once each day; and ingesting an aliquot of food or ready-to-drink beverage, comprising one or more HGH stimulating amino acids, with or without melatonin, from one to three additional times each day, without any added vitamin, mineral, hormonal or herbal supplements.

11. The method of claim 10 utilizing any ingestible ingredients, whether known or as yet undiscovered, in any quantities, in any number of aliquots per day, ingested in the form of a food bar, other food forms, or ready-to-drink beverage for the purpose of stimulating HGH so as to increase HGH blood levels for the purpose of producing anti-aging effects or for the purpose of correcting an HGH deficiency condition of the individual.

12. The method of claim 11 wherein said food bar, other food form or ready-to-drink beverage is ingested at times during the day or evening when the stomach is likely to be empty or relatively empty.

13. The method of claim 11 additionally comprising eight or more minutes of vigorous exercise performed about one hour after ingesting said food or beverage comprising HGH stimulating ingredients.

14. The method of claim 11 comprising a schedule in which the HGH stimulating system is ingested six out of every seven days, abstaining one day each week, and/or abstaining for two weeks after every three months, or abstaining for six weeks every six months.

15. A method of combining amino acids, melatonin, and/or other HGH stimulating nutrients or other ingredients, into an aliquot of food, such as a food bar, powder, other food forms, or ready-to-drink beverage so as to make unnecessary the repetitious and inconvenient purchase and daily, or several times daily, ingestion of many individual pills, powders, or liquids from a large number of different bottles, packets or other containers, some of which must be mixed with water or other liquid and stirred before ingestion.

* * * * *